(12) United States Patent
Urrea et al.

(10) Patent No.: US 10,409,274 B1
(45) Date of Patent: Sep. 10, 2019

(54) CONTROL SYSTEM BACKPLANE MONITORING WITH FPGA

(71) Applicants: National Technology & Engineering Solutions of Sandia, LLC, Albuquerque, NM (US); Jim Plusquellic, Albuquerque, NM (US)

(72) Inventors: Jorge Mario Urrea, Albuquerque, NM (US); Abraham Anthony Clements, Lafayette, IN (US); Mark Walter Learn, Albuquerque, NM (US); Jim Plusquellic, Albuquerque, NM (US)

(73) Assignees: National Technology & Engineering Solutions of Sandia, LLC, Albuquerque, NM (US); The Regents of the University of New Mexico, Albuquerque, NM (US)

( * ) Notice: Subject to any disclaimer, the term of this patent is extended or adjusted under 35 U.S.C. 154(b) by 84 days.

(21) Appl. No.: 15/454,827

(22) Filed: Mar. 9, 2017

Related U.S. Application Data

(60) Provisional application No. 62/358,671, filed on Jul. 6, 2016.

(51) Int. Cl.
*G05B 23/02* (2006.01)
*G05B 19/05* (2006.01)

(52) U.S. Cl.
CPC ....... *G05B 23/0254* (2013.01); *G05B 19/056* (2013.01); *G05B 2219/14143* (2013.01); *G05B 2219/15119* (2013.01)

(58) Field of Classification Search
None
See application file for complete search history.

(56) References Cited

U.S. PATENT DOCUMENTS

| 6,405,139 | B1 | 6/2002 | Kicinski et al. |
| 6,421,571 | B1 | 7/2002 | Spriggs et al. |
| 6,671,633 | B2 | 12/2003 | Kramb et al. |
| 7,424,744 | B1* | 9/2008 | Wu ............... H04L 63/1416 370/392 |
| 7,602,617 | B2 | 10/2009 | Brandt et al. |
| 8,301,404 | B2 | 10/2012 | Wright et al. |
| 8,503,190 | B2 | 8/2013 | Tart et al. |

(Continued)

OTHER PUBLICATIONS

Clark, Christopher R. et al. "Network intrusion detection systems on FPGAs with on-chip network interfaces." (2005). (Year: 2005).*

(Continued)

*Primary Examiner* — Kenneth M Lo
*Assistant Examiner* — Istiaque Ahmed
(74) *Attorney, Agent, or Firm* — Medley, Behrens & Lewis, LLC

(57) ABSTRACT

Described herein are various technologies for monitoring the backplane of a control system and detecting modifications of the control system (e.g., removal of modules, firmware updates, etc.). A monitoring device includes a field programmable gate array (FPGA), and is connected to the backplane of the control system. The monitoring device receives signals, by way of the backplane, that are communicated among modules connected to the backplane. The monitoring device detects a modification to the control system based upon the received signals.

14 Claims, 5 Drawing Sheets

(56) References Cited

U.S. PATENT DOCUMENTS

| | | | |
|---|---|---|---|
| 9,032,522 B1* | 5/2015 | Mulder | G06F 21/552 |
| | | | 726/23 |
| 2003/0197057 A1 | 10/2003 | Menashe et al. | |
| 2009/0132863 A1* | 5/2009 | Ashfield | G06F 11/3466 |
| | | | 714/45 |
| 2011/0119507 A1 | 5/2011 | Reidt | |
| 2012/0323344 A1* | 12/2012 | Vasko | G05B 19/41845 |
| | | | 700/32 |

OTHER PUBLICATIONS

Jasmine, Cj & Latha, T. "FPGA based Network Intrusion Detection System". Revista Tecnica De La Facultad De Ingenieria Universidad Del Zulia. vol. 39. p. 27-32. 10.21311/001.39.8.04. (Year: 2016).*

* cited by examiner

CONTROL SYSTEM BACKPLANE MONITORING WITH FPGA

RELATED APPLICATION

This application claims priority to U.S. Provisional Patent Application No. 62/358,671, filed on Jul. 6, 2016, entitled "CONTROL SYSTEM BACKPLANE MONITORING WITH FPGA", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Control systems regulate behavior of devices found in critical infrastructure (e.g., electric power, wastewater treatment, oil pipelines, etc.). Control systems can face disruption from physical interference (e.g., vibrations, water damage, etc.). Further, as control systems have become connected to the Internet, control systems have become vulnerable to cyber-attacks by malicious adversaries. For example, a cyber-attack on a control system can introduce alterations to low-level computer instructions that are executed by the control system. The alterations can lead to modifications in operation of the control system (e.g., disabling modules of control systems, preventing the modules from operating according to specifications, etc.). Modification of the control system can result in physical damage to the devices regulated by the control system. Additionally, the modification of the control system can result in machinery, controlled by the control system, operating in an undesirable manner.

Conventional approaches for monitoring a control system do not provide real-time detection of modifications of the control system. Further, conventional approaches may not monitor a control system in an electrically isolated manner. By not monitoring the control system in an electronically isolated manner, conventional approaches may present attack vectors for intelligent adversaries.

SUMMARY

The following is a brief summary of subject matter that is described in greater detail herein. This summary is not intended to be limiting as to the scope of the claims.

Described herein are features related to a system that can monitor a backplane of a control system and detect a modification of the control system. A monitoring device (e.g., which can be or include a field programmable gate array (FPGA)) can be connected to the backplane of the control system. The monitoring device can receive signals communicated over the backplane from a plurality of modules that are connected to the backplane. Responsive to receiving the signals, the monitoring device can convert the signals and generate data frames based upon the converted signals. Further, the monitoring device can be configured to filter the data frames based upon a characteristic filter. The characteristic filter comprises a set of rules defining whether or not a data frame, individually or within a group, indicates that a modification of the control system has occurred. Additionally, use of the characteristic filter can result in a performance enhancement, as unnecessary computations are avoided.

The monitoring device, additionally, can be configured to identify a specific modification of the control system based upon a comparison of the filtered data frame to a predefined list, wherein the predefined list comprises data frames that indicate that specific modifications of the control system have occurred (e.g., when a module has been remove from a slot on the backplane, when a module has ceased functioning, etc.). After determining that a filtered data frame matches a data frame from the predefined list, the monitoring device can output an indication that a specific modification of the control system has occurred.

Further, the monitoring device can comprise a computing system. The computing system can be configured to receive a plurality of filtered data frames, and to further execute algorithms over the data frames to determine whether a modification of the control system has occurred based upon a comparison of the plurality of the data frames to a model of activity of the control system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
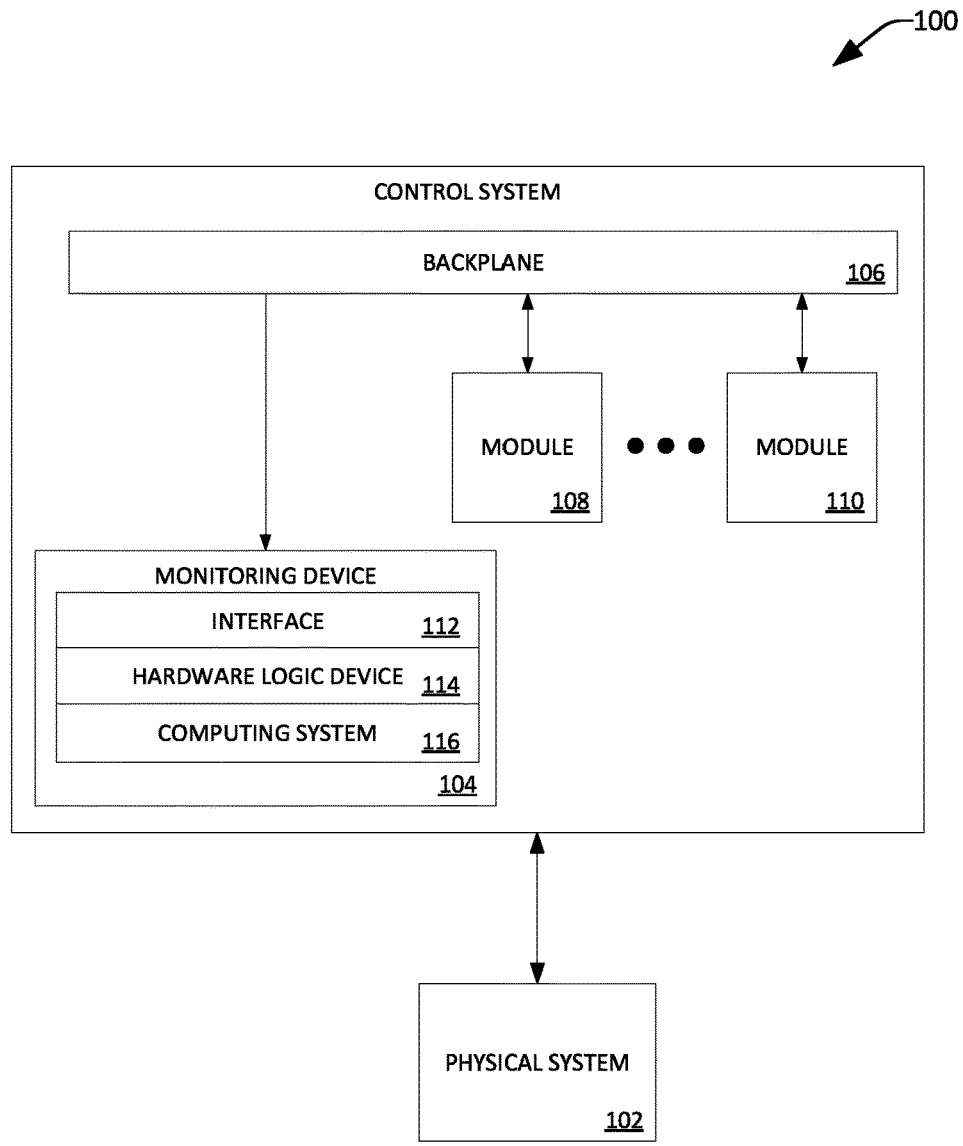
FIG. 1 is a functional block diagram of an exemplary control system, wherein the control system includes a monitoring device that is configured to detect modifications of the exemplary control system.

Various technologies are presented herein pertaining to monitoring a backplane of a control system and detecting modifications of the control system, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

With reference now to FIG. 1, an exemplary control system 100 is illustrated. The control system 100 is configured to control a physical system 102, wherein the physical system 102 comprises machinery. Generally, the control system 100 is configured to transmit control signals to the machinery of the physical system 102, wherein operation of the machinery is controlled based upon the control signals. The machinery can be or comprise the machinery of an assembly line in a manufacturing plant, machinery deployed in a power station that is used to operate the station, machinery on maritime vessels, etc. As noted above, conventionally, there has been a lack of a suitable system that is configured to detect modifications made to the control system 100 when the control system 100 is controlling operation of the physical system 102. Exemplary modifications of the control system include a (possibly undesired) firmware update, modules being added or removed from the control system, etc. The control system 100, as will be described in greater detail below, includes a monitoring device 104 that is configured to detect modification to the control system 100 while the physical system 102 is being controlled by the control system 100.

With more detail pertaining to the control system 100, the control system 100 comprises a backplane 106, modules 108-110 (which can include sensors, programmable logic controllers (PLCs), actuators, etc.), and the monitoring device 104. The backplane 106 comprises a physical assembly and a communications bus for modules of the control system 100. In an exemplary embodiment, the backplane 106 provides physical slots by way of which the modules 108-110 and the monitoring device 104 can be physically connected to the backplane 106. The communications bus of the backplane 106 facilitates communication for modules connected to the backplane 106. Further, the backplane 106 can provide power to the modules connected to the backplane 106.

The modules 108-110 can comprise a programmable logic controller (PLC) that executes control logic, where the PLC, when executing the control logic, monitors sensor signals and generates control signals based upon the sensor signals, wherein the control signals are configured to control operation of machinery controlled by way of the control system 100. Further, the modules 108-110 can comprise: 1) input devices (e.g. push-button, micro-switches, selector switches, proximity sensors, etc.) that are configured to signals that can be received as input to a PLC; and 2) output devices (displays, motors, etc.) that output data or signals.

The monitoring device 104 is configured to monitor the backplane 106 of the control system 100 and detect modifications of the control system 100 based upon signals communicated on the backplane 106. The monitoring device 104 comprises an interface 112 and a hardware logic device 114, such as a field-programmable gate array (FPGA). The interface 112 can be conceptualized as a physical interface and associated circuitry that allows for the monitoring device 110 to be coupled to a slot on the backplane 106, to receive signals placed on the backplane 106, and to place signals on the backplane. Therefore, the circuitry mentioned above can include passive components. Such configuration allows the interface 112 to receive signals communicated (by the modules 108-110) on the communications bus of the backplane 106. In the exemplary control system 100, the interface 112 is configured to refrain from sending signals to the backplane 106 from the monitoring device 104. Such configuration allows the monitoring device 104 to be electrically isolated from the remainder of the control system 100, thereby preventing the monitoring device 104 from compromising the security of the control system 100.

Due to the architecture of the exemplary control system 100, signals placed on the backplane 106 are received by all modules connected to the backplane 106. When a module from the modules 108-110 outputs a sensor signal to the backplane 106, for example, the remaining modules 108-110 and the monitoring device 104 can receive the sensor signal by way of the backplane 106, even when the signal is not directed to the remaining modules 108-110 or the monitoring device 104.

The modules 108-110 of the control system 100 communicate various signals (e.g., control signals, sensor signals, etc.) with one another by way of the communications bus of the backplane 106. A control signal comprises a command for a module from the modules 108-110 to perform an action (e.g., send data, execute a firmware update, control machinery on the physical system 102, etc.). A sensor signal comprises data that indicates the status of a module from the modules 108-110 (e.g., data indicating that the machinery connected to the physical system 102 is operating in a certain way, data representing a measurement from a device monitored by a sensor, etc.). For example, a signal communicated by the first module 108 can be a control signal that directs a second module 110 to read data from computer-readable memory of a source (e.g., machinery on the physical system 102). In the example, the first module 108 sends the control signal over the communications bus of the backplane 106, and the second module 110 receives the signal from the communications bus of the backplane 106.

Responsive to receiving the signals, the interface 112 converts the signals. For instance, the interface 112 can convert the signals into header signals and data signals, wherein a header signal of a received signal can comprise data that is indicative of an origin of the received signal, such as a module that generated the signal, an intended recipient module of the signal, time that the signal was generated, etc. A data signal of a received signal can comprise at least a portion of a payload. Further, the interface 112 can organize the header signals and data signals into first in, first out (FIFO) queues so that a header signal (from the header signals) can be grouped with one or more data signals (from the data signals) that correspond to the header signal. These queues are made accessible to the hardware logic device 114.

The hardware logic device 114 accesses the organized signals from the queues, buffers the organized signals, and generates at least one data frame for each organized signal in the organized signals. Further, the hardware logic device 114 filters the data frames based upon a characteristic filter, wherein a data frame or data frames that satisfy the characteristic filter are flagged as indicating a possible modification to the control system 100. The characteristic filter is a set of rules that, when satisfied with respect to a data frame or data frames, indicates that a modification of the control system 100 has possibly occurred. The set of rules can be based upon values of characteristics of the data frames relative to predefined values. Thus, the rules comprise the following operators: greater than, greater than or equal to, equal, less than, less than or equal to, not equal to, and bit mask. For example, the set of rules can comprise a rule that requires that a value at a bit location of the data frame be greater than a first predefined value. In another example, the set of rules can comprise a rule that requires that a size of the data frame is less than a second predefined value. The hardware logic device 114 can be configured to determine that a data frame (or a collective group of data frames) satisfies the characteristic filter when the data frame (or the collective group of data frames) satisfies all the rules in the set of rules. Alternatively, the hardware logic device 114 can be configured to determine that a data frame satisfies the characteristic filter when the data frame satisfies at least one rule (or a predetermined number of rules). Based upon determining that a data frame satisfies the characteristic filter, the hardware logic device 114 can determine that a modification of the control system 100 has possibly occurred. The hardware logic device 114, as described in greater detail below, can be configured to send the filtered data frame to an optional computing system 116.

The hardware logic device 114 is further configured to, responsive to determining that a data frame satisfies the characteristic filter (wherein a data frame that satisfies a characteristic filter is hereafter referred to as a filtered data frame), compare the filtered data frame to a predefined list. The predefined list comprises data frames that are mapped to specific modifications of the control system 100 (e.g., when a module from the modules 108-110 has been remove from a slot on the backplane 102, when a module from the modules 108-110 has ceased functioning, etc.). When the filtered data frame matches a data frame in the predefined list, the hardware logic device 114 determines that the modification mapped to the data frame in the predefined list has occurred. Responsive to determining that the specific modification has occurred, the monitoring device 104 can output an indication that the specific modification of the control system 100 has occurred. The indication can be output as a real-time visual message (e.g., a notification that a modification of the control system has been detected) to a human machine interface that comprises a display. The indication, additionally, can be output as a report on a system log (syslog) on a computing system.

Furthermore, while certain functionality is described herein as being performed by the hardware logic device 114, in some embodiments the hardware logic device 114 can perform various operations in conjunction with other systems and/or devices. For example, the monitoring device 104 can optionally comprise a computing system 116. The computing system 116 can comprise a system on a chip (e.g., XILINX ZYNC SoC). A portion of the acts described herein as being performed by the hardware logic device 114 can instead be performed by the computing system 116. Further, the computing system 116 can be configured to detect a modification of the control system 100 based upon a plurality of data frames that collectively satisfy the characteristic filter (and thus indicate a possibility of modification to the control system 100). An example of a modification that can be detected based upon the plurality of data frames comprise occurrence of a firmware update of a module in the modules 108-110.

Figure 2:
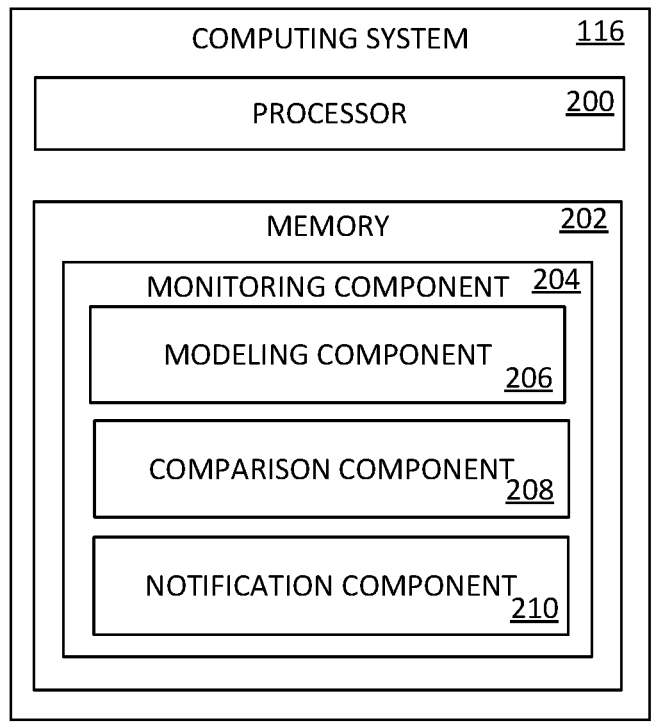
FIG. 2 is a functional block diagram of an exemplary computing system of a monitoring device that is configured to detection modifications of a control system.

With reference now to FIG. 2 a functional block diagram of the exemplary computing system 116 is illustrated. The computing system 116 comprises at least one processor 200 and memory 202. The computing system 116 is configured to receive a plurality of data frames (that individually or collectively satisfy the characteristic filter) from the hardware logic device 114. The memory comprises 202 a monitoring component 204 that, when executed by the at least one processor 200, determines whether a modification of the control system 100 has occurred based upon a comparison of the plurality of the data frames (received from the hardware logic device 114) to a model of activity of the control system 100.

The monitoring component 204 comprises a modeling component 206 that is configured to generate a model of activity of the control system 100 based upon previously captured control signals and sensor signals. The previously captured control signals and sensor signals can be captured when the control system 100 is operating under normal operating conditions. The model can be, for instance, a statistical model that can represent probabilities of certain control signals and/or sensor signals occurring with a modification of the control system 100 (e.g., firmware update of a module from the modules 108-110) concurrently, within some window of time, etc.

The monitoring component 204 further comprises a comparison component 208 that is configured to determine whether the plurality of data frames that satisfy the characteristic filter (received from the hardware logic device 114) correspond to a modification of the control system 100 represented in the model. The comparison component 208, for example, can compare the plurality of data frames (representative of signals communicated on the backplane 106) to control signal or sensor signal activity represented in the model. When the model indicates that the data frames are likely to occur during a specific modification (to the control system 100), the comparison component 208 can output an indication that the specific modification of the control system 100 has occurred. Alternatively, when the model indicates that the data frames are unlikely to occur during a modification (to the control system 100), the comparison component 208 can determine that a modification to the control system 100 has not occurred.

Responsive to determining that the specific modification has occurred, a notification component 210 can output an indication that the specific modification of the control system 100 has occurred. The indication can be output as a real-time visual message (e.g., a notification that a modification of the control system has been detected) to a human machine interface that comprises a display or a computing system. The indication, additionally, can be output as a report on a system log (syslog) on a computing system.

Figure 3:
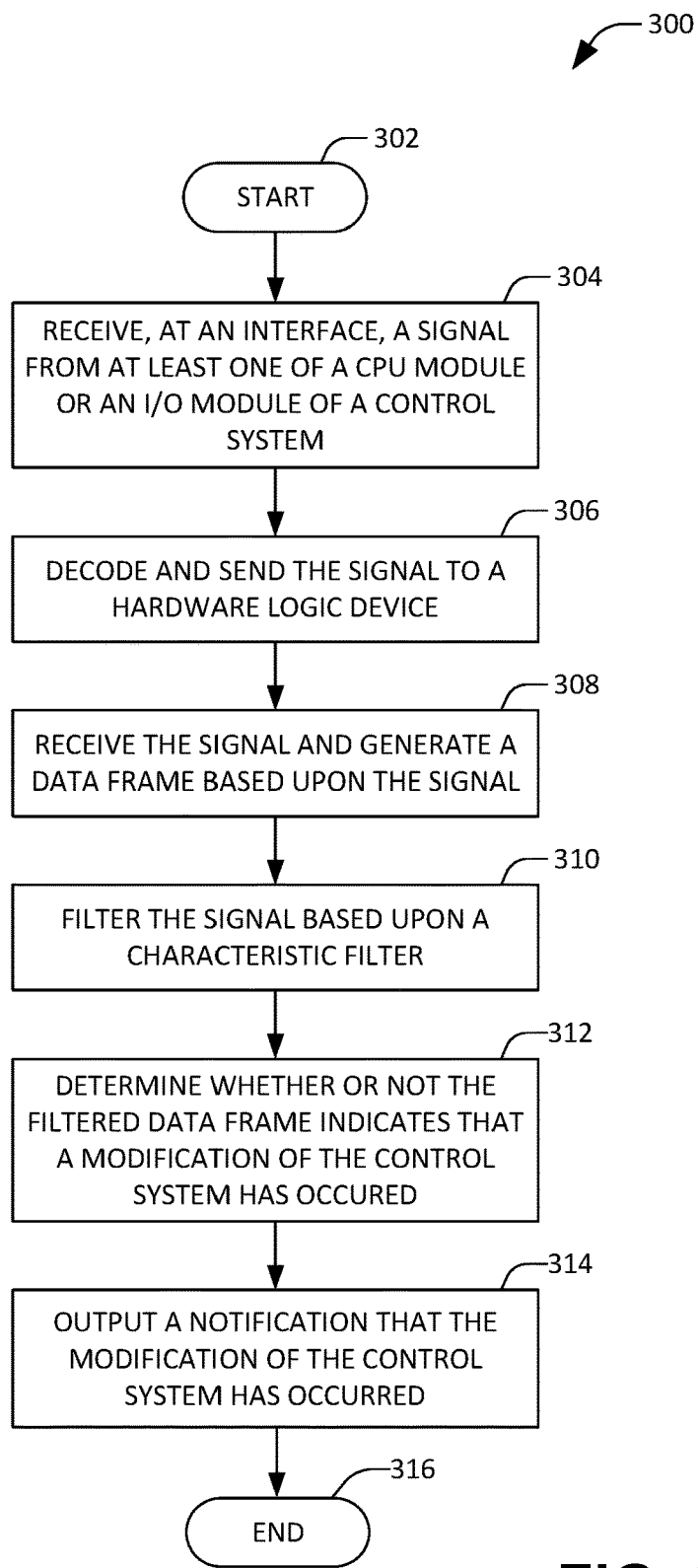
FIG. 3 is a flow diagram that illustrates an exemplary methodology for detecting modification of the exemplary control system.

Referring now to FIG. 3, an exemplary methodology 300 that facilitates monitoring of a backplane of a control system and detecting modifications of the control system is illustrated. In an example, the methodology 300 is executed by a monitoring device, which can comprise an interface and a hardware logic device, such as an FPGA. The methodology 300 begins at 302 and, at 304, a signal is received at the interface from at least one of a CPU module or an I/O module, where the CPU module and the I/O module communicate with one another by way of a communications bus of a backplane of a control system. At 306, the interface converts the signal and sends the converted signal to the hardware logic device. At 308, the hardware logic device receives the converted signal and generates a data frame based upon the converted signal. At 310, the data frame is filtered through use of a characteristic filter, wherein the characteristic filter comprises a set of rules that are applied to the data frame. When the data frame satisfies one or more rules of the characteristic filter, the data frame can be held for further analysis (e.g., filtered from other data frames). At 312, a determination is made as to whether the filtered data frame indicates that a specific modification of the control system has occurred based upon a predefined list, wherein the predefined list comprises a mapping between data frames and specific modifications to the control system. At 314, when it is determined that the specific modification of the control system has occurred, the hardware logic device outputs a notification that the specific modification of the control system has occurred. The methodology 300 completes at 316.

Figure 4:
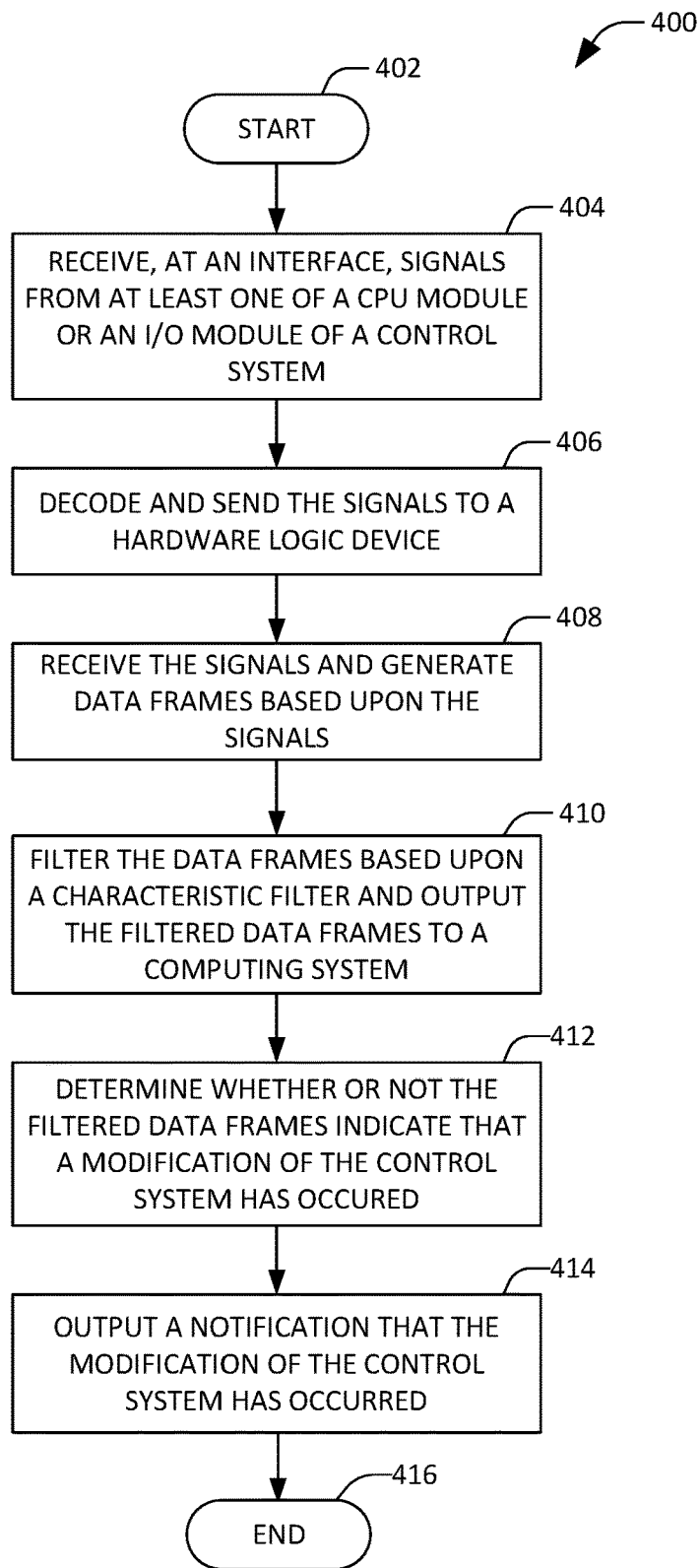
FIG. 4 is a flow diagram that illustrates an exemplary methodology for detecting modification of the exemplary control system.

Referring now to FIG. 4, an exemplary methodology 400 that facilitates monitoring of a backplane of a control system and detecting modifications of the control system is illustrated. In an example, the methodology 400 is executed by a monitoring device, which can comprise an interface, a hardware logic device, such as an FPGA, and a computing system, such as a SoC. The methodology 400 begins at 402 and, at 404, signals are received at the interface from at least one of a CPU module or an I/O module, where the CPU module and the I/O module communicate with one another by way of a communications bus of a backplane of a control system. At 406, the interface converts the signals and sends the converted signals to the hardware logic device. At 408, the hardware logic device receives the converted signals and generates data frames based upon the converted signals. At 410, the hardware logic device filters the data frames based upon a characteristic filter (as described above), and outputs the data frames to the SoC. At 412, a determination is made as to whether data frames indicate that a modification of the control system has occurred. At 414, when it is determined that the modification of the control system has occurred, the hardware logic device outputs a notification that the modification of the control system has occurred. The methodology 400 completes at 416.

Figure 5:
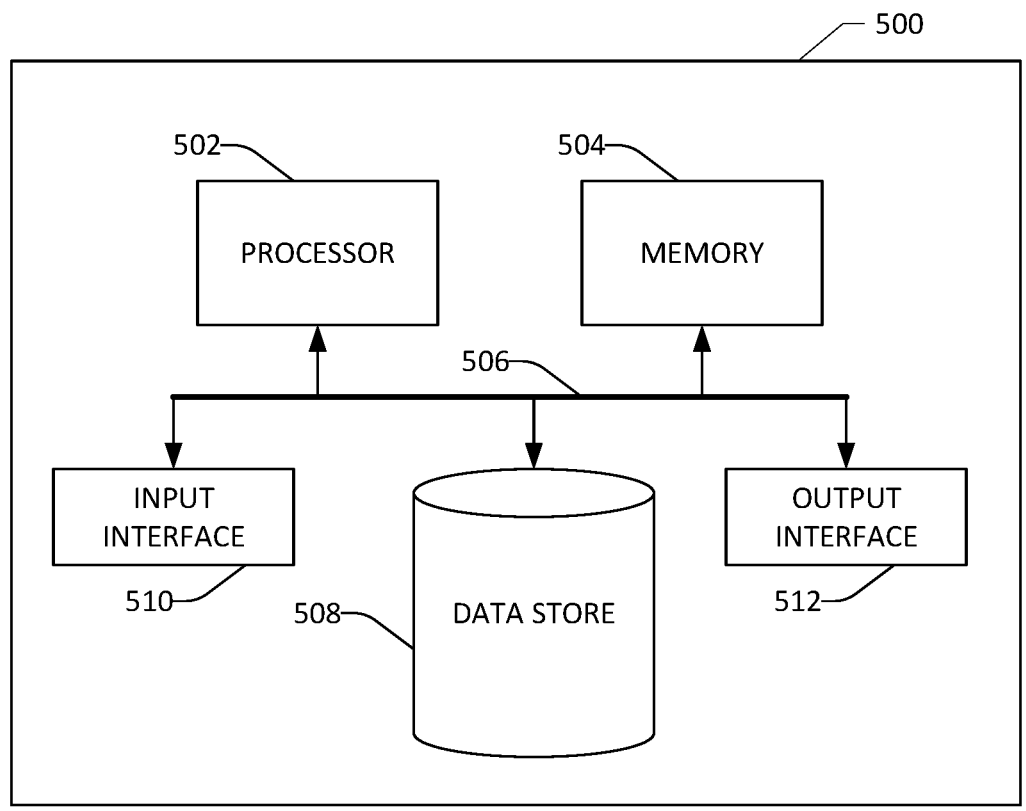
FIG. 5 illustrates an exemplary computing device.

Referring now to FIG. 5, a high-level illustration of an exemplary computing device 500 that can be used in accordance with the systems and methodologies disclosed herein is illustrated. For example, the computing device 500 may be utilized to determine whether a modification to a control system has been made. For example, the computing device 500 can operate as the computing system 116 and/or a portion thereof. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506 (which may be subdivided into a plurality of buses). In addition to storing executable instructions, the memory 504 may also store signals generated by modules on a control system, a set of rules, etc.

The computing device 500 additionally includes a data store 508 that is accessible by the processor 502 by way of the system bus 506. The data store 508 may include executable instructions, data frames, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc., by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A control system comprising:
    a monitoring device coupled to a backplane of a control system, wherein a plurality of modules send and receive signals over the backplane, the monitoring device comprising:
        an interface that is physically coupled to the backplane, wherein the interface is configured to:
            receive a signal placed on the backplane by a module in the plurality of modules;
            responsive to receiving the signal, convert the signal into a header signal and a data signal, wherein the header signal comprises an identity of the module that placed the signal on the backplane and an identity of a second module that is to receive the signal, and further wherein the data signal comprises at least a portion of a payload of the signal; and
            place the header signal and the data signal into first in first out (FIFO) queues;
        a field programmable gate array (FPGA) that is configured to access the FIFO queues, wherein the FPGA is electrically isolated from the backplane such that the FPGA is unable to place signals onto the backplane, the FPGA configured to:
            generate a data frame based upon the header signal and the data signal in the FIFO queues; and
            using a characteristic filter, filter the data frame from other data frames that correspond to other signals placed on the backplane by the plurality of modules, wherein the data frame being filtered from the other data frames is indicative of a potential modification of the control system; and
        a computing system in communication with the hardware logic device, wherein the computing system receives the data frame generated by the hardware logic device, and wherein the computing system is configured to:
            determine whether a modification of the control system has occurred based upon the data frame; and
            when the computing system determines that the modification of the control system has occurred, outputting an indication that the modification of the control system has occurred.

2. The control system of claim 1, wherein the plurality of modules comprises a programmable logic controller (PLC), and wherein the modification of the control system is an update to firmware of the PLC.

3. The control system of claim 1, wherein the computing system is further configured to determine whether the modification of the control system has occurred based upon a plurality of data frames generated by the FPGA, each of the data frames based on a respective signal placed on the backplane by a module in the plurality of modules.

4. The control system of claim 1, wherein the characteristic filter comprises a set of rules that, when applied to the data frame, compare characteristics of the data frame to respective predefined values.

5. The control system of claim 1, wherein the modification of the control system is a removal of a module in the plurality of modules from the backplane.

6. The control system of claim 1, wherein the modification of the control system is an addition of a module to the backplane.

7. The control system of claim 1, wherein the modification of the control system is an update to logic of a module in the plurality of modules.

8. A monitoring device comprising:
    an interface that is physically coupled to a backplane of a control system, wherein a plurality of modules send and receives signals over the backplane, wherein the interface is configured to:
        receive a signal placed on the backplane by a module in the plurality of modules;
        responsive to receiving the signal, convert the signal into a header signal and a data signal, wherein the header signal comprises an identity of the module that placed the signal on the backplane and an identity of a second module on the backplane that is to receive the signal, and further wherein the data signal comprises at least a portion of a payload of the signal; and
        place the header signal and the data signal into first in first out (FIFO) queues;
    a field programmable gate array (FPGA) that is electrically isolated from the backplane such that the FPGA is unable to place signals on the backplane, wherein the FPGA is configured to:
        access the FIFO queues;
        generate a data frame based upon the header signal and the data signal in the FIFO queues; and
        use a characteristic filter to filter the data frame from amongst several other data frames generated by the FPGA wherein the data frame is indicative of a potential modification of the control system, wherein
    a computing system is in communication with the hardware logic device, wherein the computing system receives the data frame from the FPGA responsive to the FPGA filtering the data frame from amongst the several other data frames, and wherein the computing system is configured to:
        determine whether the potential modification of the control system has occurred based upon the data frame; and
        when the computing system determines that the potential modification of the control system has occurred, output an indication that the potential modification of the control system has occurred.

9. The monitoring device of claim 8, wherein the plurality of modules comprises a programmable logic controller (PLC), and wherein the modification of the control system is an update to firmware of the PLC.

10. The monitoring device of claim 8, wherein the computing system is a system on a chip (SoC).

11. The monitoring device of claim 8, wherein the characteristic filter comprises a set of rules that, when applied to the data frame, compare characteristics of the data frame to respective predefined values.

12. The monitoring device of claim 8, wherein the computing system is further configured to compare the data frame to a predefined list of data frames, wherein the predefined list of data frames maps data frames to specific modifications of the control system, and further wherein the computing system determines whether the potential modification of the control system has occurred based upon the comparison.

13. The monitoring device of claim 8, wherein the computing system is further configured to apply the data frame to a statistical model of activity of the control system, wherein the statistical model of activity of the control system is indicative of probabilities of signals output by the plurality of modules co-occurring with modifications of the control system, and further wherein the computing system determines whether the potential modification of the control system has occurred based upon the statistical model of activity.

14. A method executed by a monitoring device, the method comprising:

receiving, at an interface of the monitoring device, a signal placed on a backplane of a control system by a module in a plurality of modules that are coupled to the backplane, wherein the interface of the monitoring device is also coupled to the backplane of the control system;

responsive to receiving the signal, at the interface of the monitoring device, converting the signal into a header signal and a data signal, wherein the header signal comprises an identity of the module that placed the signal on the backplane and an identity of a second module on the backplane that is to receive the signal, and further wherein the data signal comprises at least a portion of a payload of the signal;

at the interface of the monitoring device, placing the header signal and data signal into first in first out (FIFO) queues that are accessible to a field programmable gate array (FPGA) of the monitoring device;

accessing, by the FPGA of the monitoring device, the FIFO queues;

generating, by the FPGA of the monitoring device, a data frame based upon the header signal and the data signal in the FIFO queues;

filtering, by the FPGA of the monitoring device, the data frame from other data frames that correspond to other signals output to the backplane by the plurality of modules, the filtering based upon a characteristic filter, wherein the data frame being filtered from the other data frames by the characteristic filter is indicative of a potential modification of the control system, wherein a determination is made that the control system has been modified with the potential modification based upon the data frame being filtered from the other data frames.

\* \* \* \* \*